(12) United States Patent
Li et al.

(10) Patent No.: US 10,784,998 B2
(45) Date of Patent: *Sep. 22, 2020

(54) WIRELESS COMMUNICATION IN MULTI-RAT SYSTEM

(71) Applicant: FUJITSU LIMITED, Kawasaki-shi, Kanagawa (JP)

(72) Inventors: Zhaojun Li, Guildford (GB); Timothy Moulsley, Caterham (GB); Paul Bucknell, Brighton (GB); Milos Tesanovic, Harrow Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,948

(22) Filed: Jun. 1, 2017

(65) Prior Publication Data

US 2017/0272217 A1 Sep. 21, 2017

Related U.S. Application Data

(63) Continuation of application No. 14/616,147, filed on Feb. 6, 2015, now Pat. No. 9,722,743, which is a
(Continued)

(30) Foreign Application Priority Data

Oct. 19, 2012 (EP) ..................................... 12189345

(51) Int. Cl.
*H04W 4/00* (2018.01)
*H04L 5/00* (2006.01)
(Continued)

(52) U.S. Cl.
CPC ....... *H04L 5/0032* (2013.01); *H04W 28/0278* (2013.01); *H04W 28/08* (2013.01);
(Continued)

(58) Field of Classification Search
USPC ......................... 370/329, 252, 254, 281, 328
See application file for complete search history.

(56) References Cited

U.S. PATENT DOCUMENTS

| | | |
|---|---|---|
| 8,059,597 B2 | 11/2011 | Park et al. |
| 2009/0180451 A1 | 7/2009 | Alpert et al. |

(Continued)

FOREIGN PATENT DOCUMENTS

| | | |
|---|---|---|
| CN | 101946463 | 1/2011 |
| CN | 102484885 | 5/2012 |

(Continued)

OTHER PUBLICATIONS

International Search Report dated Apr. 10, 2014 in corresponding international application PCT/EP2013/071775.
(Continued)

*Primary Examiner* — Phuongchau Ba Nguyen
(74) *Attorney, Agent, or Firm* — Staas & Halsey LLP (57) ABSTRACT

A buffer status reporting scheme for a terminal (10) wishing to transmit data simultaneously in multiple RATs of a wireless communication network, which enables the co-ordination of multiple base stations (12, 14) of different RATs (e.g. LTE eNB, UMTS base station, WiFi access point, etc.) with the assistance of the terminal (10) in order to achieve efficient radio resource scheduling for multi-RAT multi-flow aggregation in uplink. A radio bearer is configured for multi-RAT multi-flow aggregation by the network, and multiple logical channel IDs are assigned to this RB that may be associated with different RATs. Logical channels associated with a certain RAT (or a given set of RATs) may be grouped into one logical channel group for radio resource scheduling reason. The terminal (10) performs buffer status
(Continued)

S10
Configure RBs across multiple RATs
|
S12
Assign one or more LCIDs to each RB
|
S14
Transmit joint BSR with entries for a set of LCIDs
|
S16
Receive joint BSR
|
S18
Schedule resources based on joint BSR reporting, according to the configuration, on all involved RATs and sends reports/indications to one or more involved base stations (12.14).

13 Claims, 7 Drawing Sheets

Related U.S. Application Data continuation of application No. PCT/EP2013/071775, filed on Oct. 17, 2013.

(51) Int. Cl.
| | | |
|---|---|---|
| *H04W 88/06* | (2009.01) | |
| *H04W 28/08* | (2009.01) | |
| *H04W 72/12* | (2009.01) | |
| *H04W 28/02* | (2009.01) | |
| *H04W 72/04* | (2009.01) | |
| *H04W 88/10* | (2009.01) | |

(52) U.S. Cl.
CPC ... *H04W 72/0413* (2013.01); *H04W 72/1221* (2013.01); *H04W 72/1226* (2013.01); *H04W 88/06* (2013.01); *H04W 88/10* (2013.01)

(56) References Cited

U.S. PATENT DOCUMENTS

| | | |
|---|---|---|
| 2010/0150082 A1 | 6/2010 | Shin et al. |
| 2011/0044192 A1 | 2/2011 | Wang et al. |
| 2011/0044218 A1 | 2/2011 | Kaur et al. |
| 2012/0071185 A1 | 3/2012 | Dayal et al. |
| 2012/0140743 A1* | 6/2012 | Pelletier ........... H04W 72/0453 370/335 |
| 2012/0207040 A1 | 8/2012 | Comsa et al. |
| 2012/0289170 A1* | 11/2012 | Li ................. H04W 72/085 455/73 |
| 2013/0016649 A1* | 1/2013 | Damnjanovic ....... H04W 88/04 370/315 |
| 2014/0022933 A1* | 1/2014 | Yi ................. H04W 24/02 370/253 |
| 2014/0031040 A1* | 1/2014 | Lee ................. H04W 36/0005 455/437 |

FOREIGN PATENT DOCUMENTS

| | | |
|---|---|---|
| EP | 2 197 235 | 6/2010 |
| WO | 2010/080669 A2 | 7/2010 |
| WO | 2011/022570 A1 | 2/2011 |
| WO | 2011/088612 A1 | 7/2011 |
| WO | 2012/021879 A2 | 2/2012 |
| WO | 2012/040265 A1 | 3/2012 |
| WO | 2012/074878 A2 | 6/2012 |
| WO | 2013/116988 A1 | 8/2013 |

OTHER PUBLICATIONS

European search report completed Mar. 19, 2013 in corresponding European application EP 12189345.7.
U.S. Notice of Allowance dated Mar. 31, 2017 in U.S. Appl. No. 14/616,147.
U.S. Office Action dated Aug. 26, 2016 in U.S. Appl. No. 14/616,147.
U.S. Appl. No. 14/616,147, filed Feb. 6, 2015, Zhaojun Li et al., Fujitsu Limited.
Chinese Office Action dated Oct. 10, 2017 in Chinese Patent Application No. 201380053401.7.

* cited by examiner

S10
Configure RBs across multiple RATs

S12
Assign one or more LCIDs to each RB

S14
Transmit joint BSR with entries for a set of LCIDs

S16
Receive joint BSR

S18
Schedule resources based on joint BSR

FIGURE 8

| RAT1 ID | BSR for RAT1 | RAT2 ID |
|---------|--------------|---------|
| BSR for RAT2 | RAT3 ID | BSR for RAT3 |

FIGURE 9

WIRELESS COMMUNICATION IN MULTI-RAT SYSTEM

CROSS-REFERENCE TO RELATED APPLICATIONS

This application is a capplication of U.S. patent application Ser. No. 14/616,147, filed Feb. 6, 2015, which is a continuation of International Application PCT/EP2013/071775, filed on Oct. 17, 2013 and claims the benefit of European Application No. 12189345.7, filed Oct. 19, 2012, in the European Intellectual Property Office, the disclosures of which are incorporated herein by reference.

FIELD OF THE INVENTION

This invention generally relates to a wireless communication system and, in particular, to a method of transmitting data from a terminal simultaneously using multiple radio access technologies to one or more base stations/access points.

BACKGROUND OF THE INVENTION

Wireless communication systems are widely known in which a terminal, subscriber station or user equipment (henceforth referred to as a UE for convenience) communicates wirelessly with a base station (or access point) by use of a certain radio access technology (RAT). Examples of such a RAT include the 3GPP family of standards including GSM, GPRS, UMTS and LTE, as well as WiMAX (IEEE802.16), CDMA and WiFi (IEEE802.11).

Although conventionally, a UE employs only one RAT at a time for its communication, UEs such as smartphones are increasingly capable of supporting more than one RAT simultaneously and moreover, several radio access networks (RANs) employing various RATs may be available in the same place, offering the possibility of multi-RAT communication to increase the overall bandwidth available to the UE. Since each RAT available in a given area may have its own base station, this implies that the UE is able to send or receive data to and from multiple base stations employing multiple RATs (and thus via multiple cells, in the case of cellular systems such as 3GPP or WiMAX) simultaneously.

Henceforth, for convenience, the term "RAT" is also used to denote a wireless communication system employing a specific RAT. Thus, "multi-RAT communication" means communication via a plurality of wireless communication systems which involve the use of a plurality of different RATs. The term "network" is used henceforth to denote the totality of all such wireless communication systems within a given geographical area, except as demanded otherwise by the context.

Similar technologies where the base stations belong to the same RAT (Radio Access Technology), such as Carrier Aggregation (CA) or Cooperative Multi-point operation (CoMP), have been introduced into 3GPP since LTE release 10. In CA two or more Component Carriers (CCs) at different frequencies are aggregated in order to support wider transmission bandwidths up to 100 MHz. A UE may simultaneously receive or transmit on one or multiple CCs depending on its capabilities. In CoMP the cooperating base stations operate at the same carrier frequency. Details of CA and CoMP as applied to LTE are given in the 3GPP standard TS36.300.

Where the base stations support different RATs the co-operation becomes more difficult. Before discussing the problems involved, it may be helpful to outline the protocol layers involved in a wireless communication system, taking LTE as an example.

As is well known, current wireless communication systems are constructed by dividing the tasks to be performed among a plurality of layered protocols, each node or entity in the system being equipped to process data at various layers (or levels within a layer) in a protocol stack, with the protocols at corresponding layers notionally communicating with each other. Although ultimately all signalling in the system is carried by the lowest, physical layer, this hierarchical arrangement allows each layer to be considered independently.

Figure 1:
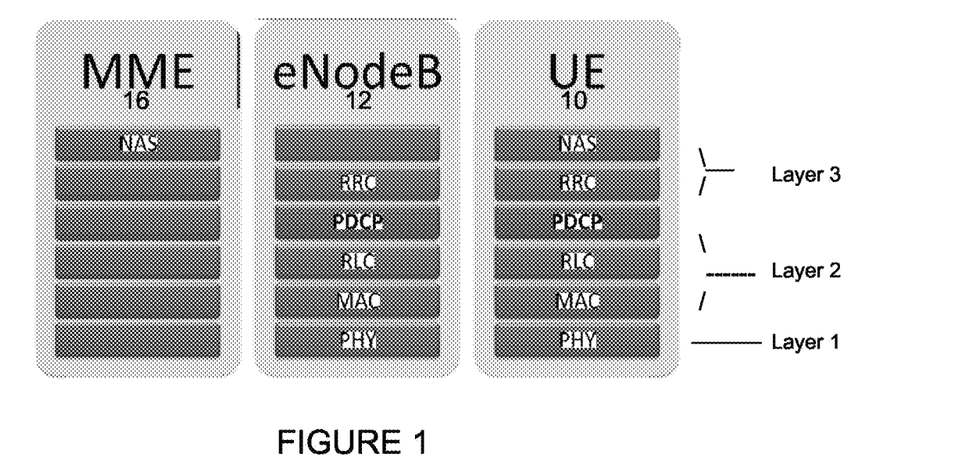
FIG. 1 shows a protocol stack employed in a 3GPP wireless communication system.

FIG. 1 shows a protocol stack in each of three main types of nodes in an LTE-based wireless communication system. These nodes are the UE 10 (subscriber station such as a mobile handset), an eNodeB 12 (the base station in an LTE system, also called eNB), and a Mobility Management Entity or MME 16 (a higher-level node for controlling mobility of UEs, in other words handovers between eNodeBs, and for setting up "bearers" as discussed below). As shown in FIG. 1, apart from non-access stratum (NAS) protocols, all the protocols terminate in the eNodeB 12 on the network side.

The horizontal bands in the Figure represent individual protocols within the protocol stack of each node in the system, and each protocol is part of a particular protocol layer within the well-known OSI model. With respect to a given node, each protocol can be considered to reside in a functional module or "entity" which can be considered separately from protocols in other layers. This allows, among other things, for the use of the concept of "radio bearers", which provide a kind of tunnel between peer entities in the base station and UE at a given protocol level for user data or control signalling. Radio bearers are associated with "logical channels" which link SAPs (Service Access Points) for peer-to-peer communication between MAC and RLC protocol layers discussed below.

Packets belonging to the same radio bearer get the same end-to-end treatment in the network. There are two main bearer types, Guaranteed Bit Rate (GBR) and non-GBR. For GBR bearers, the network guarantees a certain bit rate to be available for the bearer at any time. The bearers, both GBR and non-GBR are further characterized by a Maximum Bit Rate (MBR), which limits the maximum rate that the network will provide for the given bearer. In this way it is possible for each radio bearer to provide a certain quality of service, QoS. For each radio bearer, which exists between the UE 10 and the eNodeB 12, there is a corresponding access bearer between the eNodeB and a Packet Data Network Gateway, PDN GW (not shown).

Figure 2:
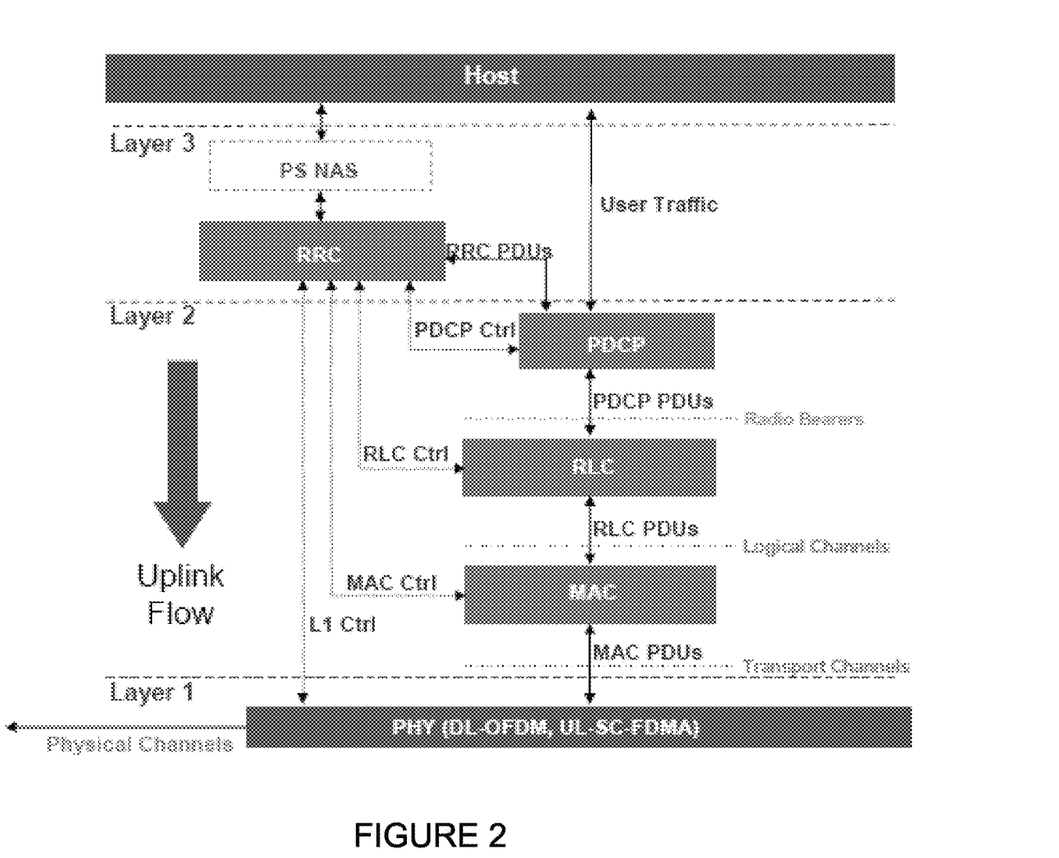
FIG. 2 illustrates an uplink flow of packets between the protocol layers in FIG. 1.

FIG. 2 is a slightly less conceptual view than FIG. 1, showing the protocol stack for one node and concentrating on the uplink (that is, the direction of transmission from the UE to the network). FIG. 2 illustrates how packets are exchanged between protocols at different layers, and shows the effect of Radio Resource Control, RRC on managing various protocols. The protocol stack in FIG. 2 is for handling user traffic (such as data being uploaded) and is referred to as the "user plane", as distinct from the "control plane" used to carry network signalling.

As indicated in FIGS. 1 and 2, there is a physical layer protocol PHY at the lowest level, Layer 1, responsible for actual wireless transmission of data over the air, using the frequency band(s) of the RAT in use, and employing the transmission scheme of that RAT; for example, in the case of the downlink in LTE, this is orthogonal frequency division multiplexing (OFDM). In LTE, the unit of data transfer in the PHY is the Transport Block (TB). The TBs are passed to the PHY layer from the next-higher layer (MAC) once per Transmission Time Interval (TTI) of 1 ms. Scheduling can be performed in units of 1 TTI or more, in other words on a timescale as short as 1 ms.

Thus, in the case of the uplink, packets are processed in successively-lower levels in the protocol stack before being passed to the PHY for conversion to radio signals for transmission to the network. Incidentally, within each protocol the packets are referred to as "protocol data units" (PDUs) and the PDUs of one level in the stack form so-called Service Data Units (SDUs) of the next stage, possibly after concatenation or segmentation. Each TB from the PHY corresponds to a MAC PDU.

Above the PHY there are the layer-2 protocols MAC, RLC and PDCP.

MAC stands for Media Access Control and is responsible for managing the so-called hybrid ARQ function (see below), and for extracting different logical channels out of the transport block for the higher layers. Format selection and measurements provide information about the network that is needed for managing the entire network.

Logical channels exist at the top of the MAC. They represent data transfer services offered by the MAC and are defined by what type of information they carry. Types of logical channels include control channels (for control plane data) and traffic channels (for user plane data). Transport channels DL-SCH and UL-SCH are in the transport blocks at the bottom of the MAC. They represent data transfer services offered by the PHY and are defined by how the information is carried, different physical layer modulations and the way they are encoded.

A MAC entity of the eNB in an LTE system includes a scheduling function responsible for managing resource scheduling for both uplink and downlink channels, that is, to allocate physical layer resources for the DL-SCH and UL-SCH transport channels. Different schedulers operate for the DL-SCH and UL-SCH. The scheduler should take account of the traffic volume (buffer status) and the QoS requirements of each UE and associated radio bearers, when sharing resources between UEs. Schedulers may assign resources taking account the radio conditions at the UE identified through measurements made at the eNB and/or reported by the UE. Radio resource allocations can be valid for one or multiple TTIs.

Likewise, the terminal (UE) has a MAC entity with a scheduling function for, in accordance with a resource allocation signalled to it by the eNB, constructing transport blocks from data for transmission which has arrived in a buffer of the UE.

The Hybrid Automatic Repeat-reQuest (HARQ) process, done in combination between the MAC and the PHY, allows retransmission of transport blocks for error recovery. The retransmission is performed by the PHY, and the MAC performs the management and signalling. The MAC indicates a NACK when there is an error in a cyclic redundancy code, CRC, added to a transport block, and the PHY usually indicates that failure. Retransmission is done by the eNodeB or the sender on the downlink using a different type of coding. The coding is sent and maintained in buffers in the eNodeB. Eventually, after one or two attempts, there will be enough data to reconstruct the transport blocks.

The MAC layer receives RLC PDUs from the next-higher layer-2 protocol, RLC. RLC stands for Radio Link Control, and performs segmentation and reassembly and operates in three modes: transparent mode (TM), acknowledged mode (AM) and unacknowledged mode (UM). These are used by different radio bearers for different purposes. The RLC provides in-sequence delivery and duplicate detection.

Other wireless communication systems such as UMTS and WiMAX also employ RLC. Although WiFi (IEEE802.11) does not employ a RLC protocol as such, the logical link control (LLC) layer in WiFi has a similar role.

The next protocol in the stack above RLC, still within layer-2 of the OSI model, is PDCP. PDCP stands for Packet Data Control Protocol and, being of particular interest for present purposes, is described in some detail. Further details can be found in 3GPP standard TS 36.323.

ROHC referred to below stands for Robust Header Compression and refers to a technique used to reduce the header size of packets in LTE. Since LTE is completely IP-based, voice calls have to be carried using IP (Voice over IP or VoIP) and without some measure to reduce the header size, this would be inefficient.

PDCP functions in the user plane include decryption, ROHC header decompression, sequence numbering and duplicate removal. PDCP functions in the control plane include decryption, integrity protection, sequence numbering and duplicate removal. There is one PDCP entity (in other words, PDCP instance) per radio bearer. Therefore, different PDCP entities exist which are associated with either the control plane or the user plane depending on the type of bearer.

Figure 3:
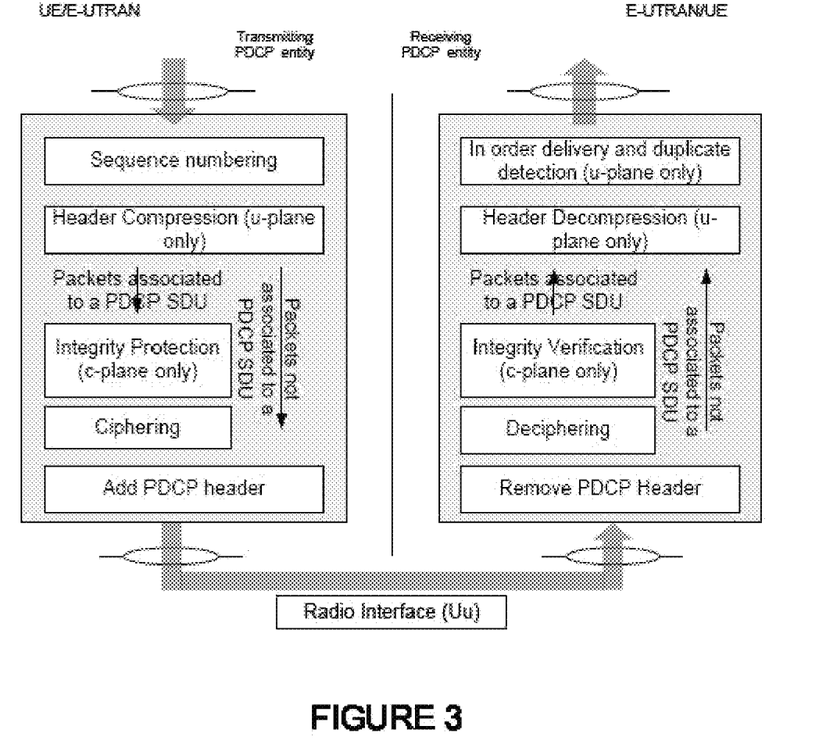
FIG. 3 shows the functions of a PDCP entity in the PDCP protocol layer.

FIG. 3, taken from the above mentioned TS36.323, is a functional view of the PDCP layer. In this Figure, u-plane denotes the user plane and c-plane, the control plane. The left-hand portion of the Figure show functional blocks involved on the uplink and the right-hand side shows the functions performed on the downlink.

As shown in FIG. 3, the PDCP layer is responsible for various tasks including:

Sequence numbering, which allows in-order delivery of packets, and duplicate detection: if the PDCP layer receives packets with the same sequence number, then it discards duplicates and does not send them to upper layers Header compression and decompression for user plane data Integrity protection and verification for control plane data (however, there is no integrity protection offered to the user plane data)

Ciphering and Deciphering of user plane and control plane data

Addition/removal of a PDCP Header (not shown) Security and Handover functions.

There is one to one correspondence between a PDCP SDU and a PDCP PDU. That is, there is no segmentation or concatenation in the PDCP layer. Addition of a PDCP header, applying compression and security on the PDCP SDU makes a PDCP PDU. Similarly deciphering, decompression and removal of the PDCP header makes a PDCP SDU from a PDCP PDU.

In LTE, the above mentioned radio bearers (RBs) are defined at various protocol levels including PDCP. There are two kinds of PDCP bearers: SRB (Signalling Radio Bearer) and DRB (Dedicated Radio Bearer). There are only two SRBs—SRB1 and SRB2. These are used by control plane protocol to send the packets to the UE. DRBs are used for sending voice and data; as many DRBs are set up as the number of QoS streams or services required by the terminal. When a DRB is set up, a Logical Channel Identity (LCID) will be assigned to this DRB for UL and DL. In this sense, it may be said that one logical channel (LC) conventionally corresponds to one RB. For the purpose of resource allocation, the logical channels may in turn be assigned to Logical Channel Groups (LCGs). Conventionally, a given LCID or LCG can be associated with only one RAT.

Layer 3 protocols in the UE include RRC or Radio Resource Control, which is responsible for connection management, bearer control, and handovers to other base stations, UE measurement reporting, and QoS management.

Finally NAS stands for Non-Access Stratum which forms the highest-level of communication between the UE 10 and MME 16. The layers under the NAS are also referred to as the Access Stratum (AS) since they concern the radio access network which terminates at the eNodeB. NAS protocols support the mobility of the UE and the session management procedures to establish and maintain IP connectivity between the UE and a packet data network gateway, PDN GW. They define the rules for a mapping between parameters during inter-system mobility with 3G networks or non-3GPP access networks.

Figure 4:
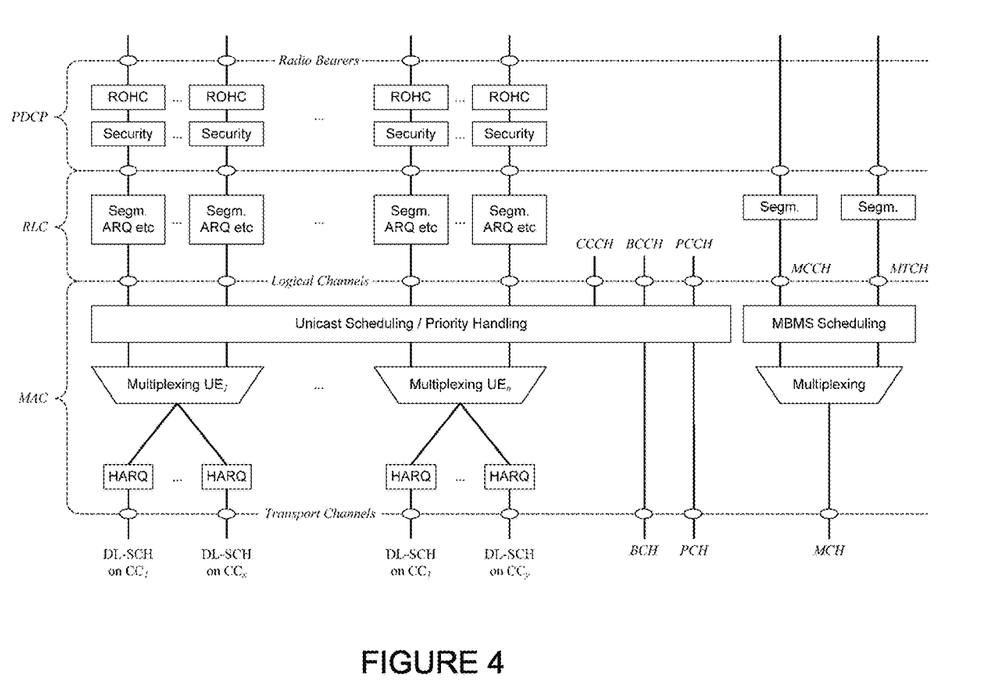
FIG. 4 illustrates the Layer 2 structure for the downlink of a wireless communication system configured for carrier aggregation (CA)
Figure 5:
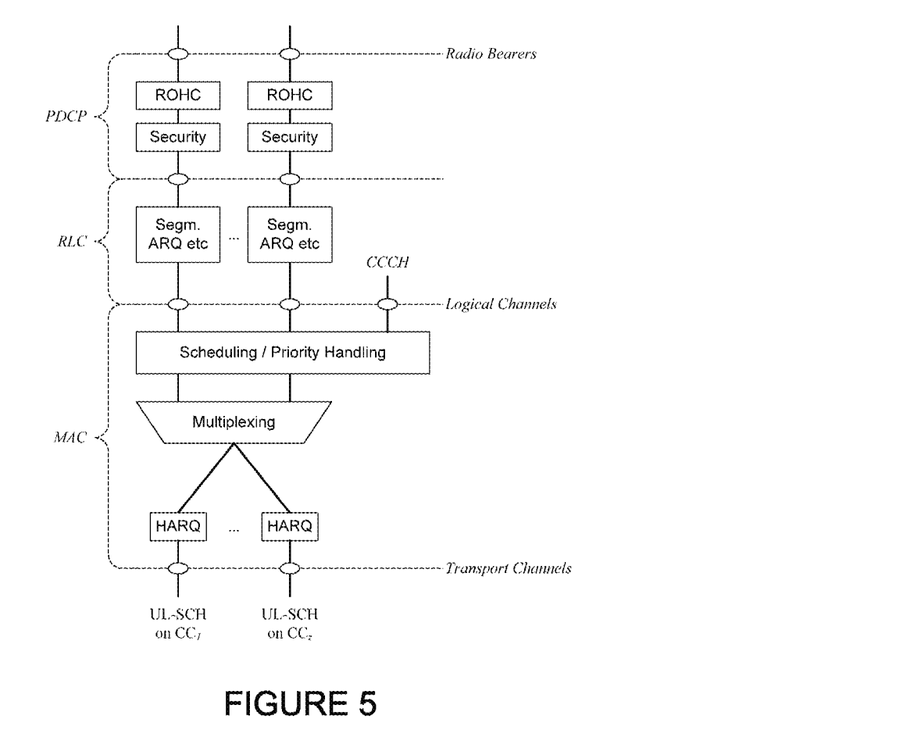
FIG. 5 illustrates the Layer 2 structure for the uplink of a wireless communication system configured for carrier aggregation (CA)

Returning now to the scenario of CA within LTE, the typical Layer 2 structures for downlink and uplink with CA configured in LTE networks are illustrated in FIGS. 4 and 5 respectively. As is apparent from these Figures, the multi-carrier nature of the physical layer is only exposed to the MAC layer for which one HARQ entity is required per serving cell. In both uplink and downlink, there is one independent hybrid-ARQ entity per serving cell and one transport block is generated per TTI per serving cell in the absence of spatial multiplexing. Each transport block and its potential HARQ retransmissions are mapped to a single serving cell.

When CA is configured, the UE only has one RRC connection with the network. At RRC connection establishment/re-establishment/handover, one serving cell provides the NAS mobility information (e.g. Tracking Area Identity, TAI), and at RRC connection re-establishment/handover, one serving cell provides the security input. This cell is referred to as the Primary Cell (PCell). Generally, one carrier corresponds to one cell. In the downlink, the carrier corresponding to the PCell is the Downlink Primary Component Carrier (DL PCC) while in the uplink it is the Uplink Primary Component Carrier (UL PCC).

However, the above discussion relates to a single RAT (namely, LTE). The problem addressed by this invention is in a wireless communication system where multiple radio access technologies (e.g. GSM, UMTS, LTE and beyond, WiMAX, WiFi, etc.) are available in the whole network or in certain areas, such as city centres (either full time, or during peak hours only).

For simplicity, LTE and WiFi will be used as an example of multiple RATs co-existing in a wireless communication system. FIGS. 6(A) and 6(B) illustrate two examples of typical deployment scenarios in such system; in case (A), the LTE eNB and WiFi AP are separated (in other words provided by different pieces of equipment), while in case (B) the LTE eNB and WiFi AP are co-located, in other words a single unit acts as a combined LTE base station and WiFi access point. In both cases, the UEs are assumed to be dual (or more) mode devices having a WiFi interface. It is further assumed that there is some form of backhaul network (such as broadband Internet) connecting both the eNB and AP to a core network.

Based on the current 3GPP standard as set out in TS36.300, measurement reports, including transport volume and measurements of a UE's radio environment, are required to enable the scheduler in the eNB to operate in both uplink and downlink. Especially, in the uplink direction, uplink buffer status reports (BSR) are needed from the UEs to provide support for QoS-aware packet scheduling by the eNB.

The uplink buffer status reports refer to the data, ready for uplink transmission, that is buffered for a group of logical channel (LCG) in the UE. Four LCGs and two formats are used for reporting in uplink:

A short format for which only one BSR (of one LCG) is reported;

A long format for which all four BSRs (of all four LCGs) are reported.

Uplink buffer status reports are transmitted using MAC signalling. RRC controls BSR reporting by configuring the two timers periodicBSR-Timer and retxBSR-Timer and by, for each logical channel, optionally signalling logicalChannelGroup which allocates the logical channel to an LCG.

The LC may be assigned to the RB, and LC may be assigned to a LCG, when the RB is set up; however it may be useful to reassign LCs to LCGs for example when a new RB is added or an existing RB is removed. If an explicit configuration is not signalled, there is a default configuration, but only for SRBs.

For RATs other than LTE, the concept of a LCG may not be explicitly defined; nevertheless it is still possible to group radio bearers sharing common characteristics (QoS, bit rate, delay and so on). The term "logical channel group" includes such groupings.

Figure 6:
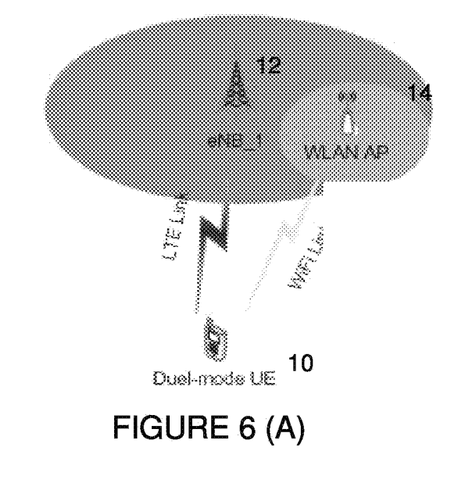

Based on current 3GPP specifications, BSR can be used for intra-RAT (i.e. intra-LTE) cases only when CA or CoMP is configured. However, in the multi-RAT scenarios (as shown in FIG. 6) resource scheduling between the RATs becomes very challenging; especially for FIG. 6(A) where LTE eNB and WiFi AP are separated and backhaul support cannot be assumed to be ideal for the information exchange between the multi-RAT nodes. The key issue in such scenarios in the uplink is how sufficient information can be provided via buffer status reports to assist the network to co-ordinate the radio resource scheduling with multiple nodes of different RATs in order to achieve efficient UL multi-flow aggregation. The present invention is mainly intended to address this issue.

US 2012/0140743 A1 discloses a method according to the preamble of claim 1, wherein a terminal receives, over a primary channel associated with a first RAT, provisioning information of a supplementary channel associated with a second RAT.

WO 2011/088612 A1 discloses methods that provide for control signalling in multi-radio access environments. One method includes implementing radio resource management and a general link layer jointly across at least two radio access technology modules, and selecting one of the radio access technology modules to perform control signalling in a multi-radio environment.

SUMMARY OF THE INVENTION

According to a first aspect of the present invention, there is provided a method for uplink communication between a terminal and a multi-RAT wireless communication network comprising one or more base stations, the method comprising:

in the multi-RAT wireless communication network,
configuring radio bearers, each radio bearer to be carried by one or more radio access technologies, RATs, among a plurality of RATs available to the terminal, and associating logical channels with radio bearers by assigning to each radio bearer one or more logical channels;
characterised by
in the terminal,
transmitting one or more buffer status reports wherein at least one of the buffer status reports contains information on data to be sent on a first set of logical channels associated with a first set of said radio bearers where the first set of radio bearers is to be carried by more than one RAT.

Here, RAT means radio access technology such as GSM, GPRS, UMTS and LTE, as well as WiMAX (IEEE802.16), CDMA and WiFi (IEEE802.11). Where required by the context, RAT means a wireless communication system employing the RAT for its operation. Preferably, one of the RATs is LTE.

The multi-RAT wireless communication network, below referred to simply as "network", means the combined wireless communication systems available to the terminal unless otherwise demanded by the context.

The terminal includes any kind of subscriber station, user equipment or other wireless device of a user, whether mobile or fixed, and can also extend to a relay station.

The base station includes any form of radio access node employed in a given RAT for providing an air interface with wireless devices, and includes for example an eNB of an LTE wireless communication system, or a base station of a UMTS wireless communication system, as well as an access point in a WiFi WLAN.

The radio bearer, apart from its specific meaning in the context of LTE, can be regarded as a service provided by the access stratum of a RAT to the non access stratum (core network) for delivering data between a terminal and the core network.

In addition to the above mentioned configuring in the network, typically some configuration will also occur in the terminal.

The data to be sent, information on which is contained in the buffer status reports, refers to data in a buffer of the terminal, used to hold data temporarily prior to uplink transmission. In the present invention at least one buffer status report contains information on data to be sent and relating to more than one RAT, or more correctly defined, with respect to a set of logical channels associated with a set of bearers carried by more than one RAT. The buffer status reports may be transmitted for the purpose of assisting the multi-RAT uplink scheduling.

A logical channel means some form of designation applied to radio bearers, for example for the purpose of scheduling. Various relationships are possible among the radio bearers (RBs), the RATs, and the logical channels. For example, embodiments of the present invention include the case of: (i) multiple RATs and multiple RBs, where one of a plurality of configured RBs is carried by only one RAT; and (ii) where one or more RBs may each only be assigned one logical channel.

Preferably, one or more groups of logical channels are configured from among the first set of logical channels, and the at least one of the buffer status reports contains information on data to be sent on each of the one or more groups of logical channels.

At least one of the one or more groups of logical channels may be configured to contain a second set of logical channels associated with a second set of radio bearers where the second set of radio bearers is to be carried by more than one RAT. Here, the second set is a subset of the first set.

Alternatively the method may further comprise configuring a second set of logical channels associated with a second set of radio bearers to be carried by a single RAT, the method further comprising the terminal, prior to transmitting buffer status reports, assigning data to the third set of logical channels for uplink transmission in accordance with at least one of:
a preference for that single RAT;
a signal quality with respect to that single RAT;
a quality of service requirement for the data; and
a network constraint on usage of that single RAT.

A further, optional step of the method is the network, granting, in respect of a said set of logical channels associated with a said set of said radio bearers, uplink resources on one or more RATs on the basis of:
the one or more buffer status reports; and
a network policy on usage of each RAT for uplink data transmission.

Alternatively the above configuring may further comprise configuring a second set of logical channels associated with a second set of said radio bearers to be carried by one or more of the plurality of RATs available to the terminal excluding a specific RAT.

In one form of the method, the buffer status report is transmitted to each base station providing one or more of the RATs to which the buffer status report relates. In other words the report may be received from the terminal separately by multiple base stations.

Alternatively the buffer status report is transmitted to a base station operating according to one or more of the RATs, which base station forwards at least the relevant part of the buffer status report to one or more base stations operating according to the or each other RAT by which the first set of radio bearers is configured to be carried. In this way, it is sufficient if only one of the base stations receives the report from the terminal.

Preferably the buffer status report includes one or more entries for each RAT covered by the report, in other words for each RAT by which the first set of radio bearers is configured to be carried, and the terminal indicates a preference not to employ a given RAT for its uplink transmission by use of one or more reserved values, such as zero, in at least one entry with respect to that RAT in the buffer status report.

Alternatively the buffer status report includes entries for only a subset of the RATs by which the first set of radio bearers is configured to be carried, the terminal indicating a preference not to employ a given RAT for its uplink transmission by omitting the entry for that RAT from the buffer status report.

More generally, in the case of one or more entries in the buffer status report for each RAT, the terminal indicates a preference not to employ a given RAT for its uplink transmission by omitting at least one of the one or more entries in the buffer status report which is or are associated with the given RAT According to a second aspect of the present invention, there is provided a multi-RAT wireless communication system comprising:
a terminal arranged to perform at least uplink communication via first and second RATs;
first base station means for the first RAT; and
second base station means for the second RAT; wherein the first and second base station means are arranged to co-operate to configure radio bearers to be carried at least on the uplink by one or more of the first and second RATs, and to associate logical channels with radio bearers by assigning one or more logical channels to the radio bearer; characterised in that the terminal is arranged to assist said multi-RAT uplink scheduling by transmitting one or more buffer status reports wherein at least one of the buffer status reports contains information on data to be sent on a set of logical channels associated with a set of said radio bearers to be carried by more than one RAT.

According to a third aspect of the present invention, there is provided a base station using a first RAT for use in a multi-RAT wireless communication system in which system a terminal is arranged to perform at least uplink communication via first and second RATs; the base station arranged to:

co-operate with a second base station which uses the second RAT, to configure radio bearers to be carried at least on the uplink by one or more of the first and second RATs, and to associate logical channels with radio bearers by assigning one or more logical channels to the radio bearer; characterised in that the base station is further arranged to:

receive, from the terminal, one or more buffer status reports wherein at least one of the buffer status reports contains information on data to be sent on a set of logical channels associated with a set of said radio bearers to be carried by the first and second RATs; and assign, in respect of the set of logical channels associated with the set of said radio bearers, resources for uplink transmission by the terminal in the first RAT, in co-operation with the second base station assigning resources in the second RAT, on the basis of the at least one of the buffer status reports.

Here, preferably, the base station is further arranged to forward to the second base station at least a portion of the buffer status report relating to the second RAT.

According to a fourth aspect of the present invention, there is provided a multi-RAT base station provided for wireless communication at least on an uplink with a terminal via first and second RATs and arranged to:

configure radio bearers, each of the radio bearers to be carried at least on the uplink by one or more of the first and second RATs, and associate logical channels with radio bearers by assigning one or more logical channels to each radio bearer; characterised in that the base station is further arranged to:

receive, from the terminal, one or more buffer status reports wherein at least one of the buffer status reports contains information on data to be sent on a set of logical channels associated with a set of said radio bearers to be carried by the first and second RATs; and assign, in respect of the set of logical channels associated with the set of said radio bearers, resources in the first and second RATs for uplink transmission by the terminal on the basis of the at least one of the one or more buffer status reports.

According to a fifth aspect of the present invention, there is provided a terminal for use in a multi-RAT wireless communication system in which the terminal is arranged to perform at least uplink communication via first and second RATs; the terminal arranged to:

receive a configuration of radio bearers to be carried at least on the uplink by one or more of the first and second RATs, in which configuration logical channels are associated with radio bearers by assigning one or more logical channels to each radio bearer; characterised in that the terminal is further arranged to:

transmit one or more buffer status reports wherein at least one of the buffer status reports contains information on data to be sent on a set of logical channels associated with a set of said radio bearers where the set of radio bearers is to be carried by the first and second RATs; and receive, in response to the buffer status reports, an assignment of resources for uplink transmission by the terminal in the first and second RATs with respect to the set of logical channels.

In another aspect, the present invention relates to a computer program (which may be stored to a computer-readable medium) comprising program code for causing a computer to carry out a method as described in the present application or to operate as a terminal as described in the present application or as a base station as described in the present application.

Thus, the present invention enables a novel buffer status reporting scheme which enables the co-ordination of multiple base stations of different RATs (e.g. LTE eNB, UMTS base station, WiFi access point, etc.) with the assistance of the UEs in order to achieve efficient radio resource scheduling for multi-RAT multi-flow aggregation in uplink.

When the radio bearer RB (with multi-RAT multi-flow aggregation configured) is set up by the network, multiple logical channel IDs are assigned to this RB that may be associated with different RATs. Logical channels associated with a certain RAT (or a given set of RATs) may be grouped into one logical channel group for radio resource scheduling reason. On the terminal side, the UE performs the buffer status reporting procedure, according to the configuration, on all involved RATs and sends reports/indications to one or more involved base stations.

Working at the PDCP layer in accordance with the present invention provides more flexibility for multi-RAT aggregation, in comparison with other approaches such as providing aggregation at the MAC level.

BRIEF DESCRIPTION OF THE DRAWINGS

Preferred embodiments of the present application are described, by way of example, with reference to the accompanying drawings in which:—

FIGS. 6(A) and (B) show two example deployment scenarios in a multi-RAT network (LTE and WiFi);

DETAILED DESCRIPTION

Before describing preferred embodiments of the present invention, some underlying principles will first be explained.

Embodiments of the present invention can provide a novel buffer status reporting scheme which enables the co-ordination of multiple base stations of different RATs (e.g. LTE eNB, UMTS base station, WiFi access point, etc.) with the assistance of the UEs in order to achieve efficient radio resource scheduling for multi-RAT multi-flow aggregation in the uplink. Embodiments of the present invention are principally aimed at the user plane (data traffic). In practice, it is likely that control plane traffic is carried over the more capable/more reliable RAT among those available, e.g. LTE.

In this scheme, multiple cells of different RATs can simultaneously schedule transport block(s) for transmission from a single UE. (For simplicity, it can be assumed that each RAT provides one cell, but it would be possible for a UE to communicate via more than cell simultaneously in the same RAT). The conventional approach would be that for simultaneous use, different RATs employ different frequencies. However, this does not rule out the possibility that they could use the same frequencies, for example at different times in the same frame, or even at the same time.

If the same data is sent via multiple RATs this provides diversity. If the data is different, then this can provide higher data rates. The different cells can belong to the same base station (where multiple RATs are co-located in the same node as in FIG. 6(B)), or belong to non co-located base stations of different RATs (FIG. 6(A)). The supported RATs can be 3GPP radio access technologies, such as GSM, GPRS, UMTS, LTE and beyond; or non-3GPPP radio access technologies, such as WiMAX, CDMA, WiFi, etc.

When a UE is configured with multi-RAT multi-flow aggregation for its on-going application(s), for each of the applications one or several radio bearers may be allocated with certain QoS requirements. Incidentally, more than one RB may be set up to provide the application: for example, to service a multimedia application one RB for video and another for audio. Another example is scalable video where a base layer is sent over one RB and enhancement layers over other RB(s) of other, possibly less reliable, RATs; each of these RBs may be supported by one RAT or multiple RATs. It would also be possible to send multiple versions (with varying levels of redundancy) of a still image or video clip, over multiple RBs to provide diversity.

Figure 7:
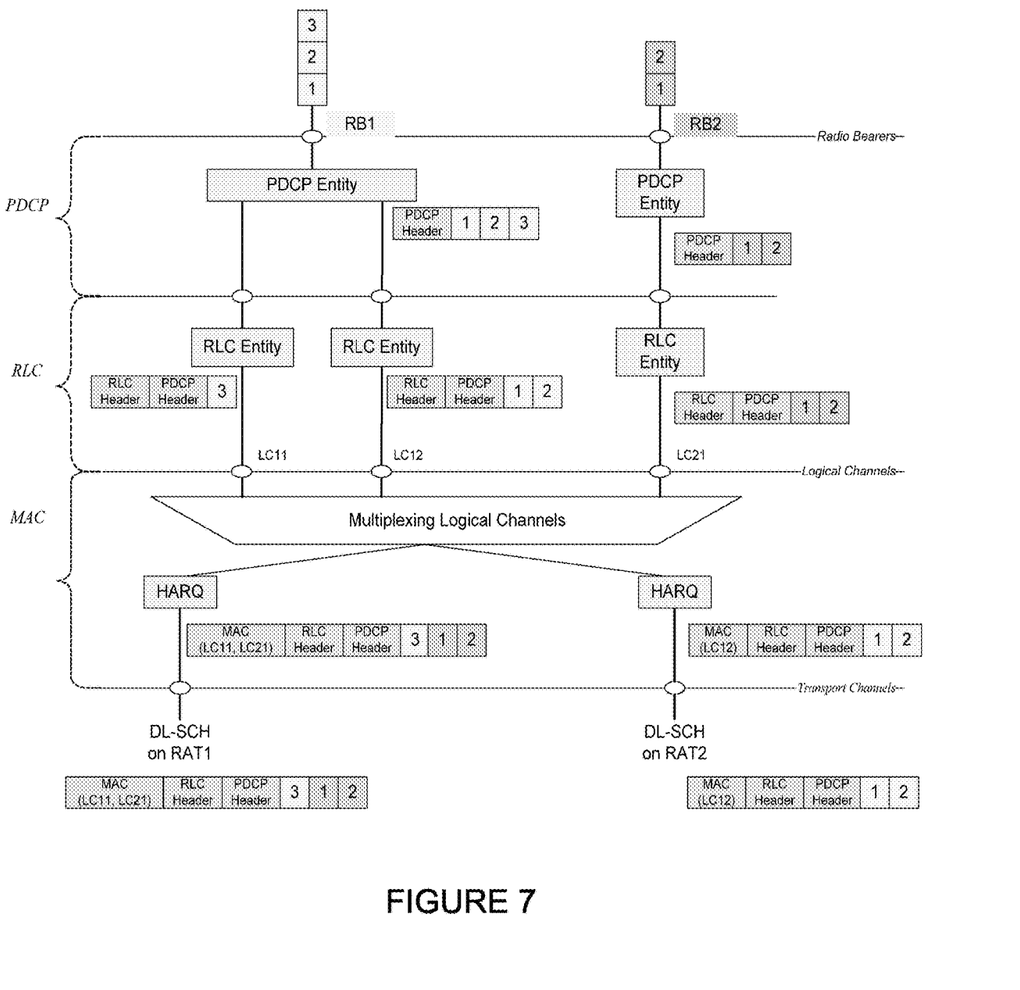
FIG. 7 shows an example of the Layer 2. Structure for the uplink of a multi-RAT network in accordance with the present invention.

On the terminal side, the UE maintains a layer-2 structure, e.g. as shown in FIG. 7. In FIG. 7, the numbered boxes "1", "2", "3" represent uplink application layer packets. In this example, there are two radio bearers currently allocated to this UE. Especially for RB1, multi-RAT multi-flow aggregation (RAT1 and RAT2 in this example) has been configured. Thus, RB1 is a multi-RAT bearer which spans multiple RATs. RB2, by contrast, is a conventional RB set up in a single RAT.

As illustrated in FIG. 7, a single PDCP Entity is associated with the multi-RAT radio bearer RB1. This PDCP Entity is then associated with two sets of RLC Entities for RAT1 and RAT2 respectively. Note that for simplicity, it is assumed in this example shown in FIG. 4 both RAT1 and RAT2 use a similar RLC/MAC structure. In practice, it is not necessarily the case; and different RATs may use their own RLC or "RLC like" structure and MAC layer implementation.

The box labelled "HARQ" in the MAC layer represents the HARQ entity mentioned earlier. As shown, the PDCP Entity and RLC Entity/RLC Entities are associated with one radio bearer, while MAC is shared by all radio bearers (both RB1 and RB2 in this example). The HARQ Entity is associated with one CC in case of CA. There is not necessarily a HARQ entity in every RAT (for example, WiFi does not employ HARQ).

Incidentally, "PDCP Entity" is a 3GPP term, which may not have a recognised meaning in other networks (such as WiFi and WiMAX). However, similar functions may be carried out by different entities in other systems (or perhaps not carried out at all). Thus, non-3GPP RATs may need to adopt a simple PDCP function.

Also, although "RLC Entity" is a 3GPP term, there may be similar functionality in other non-3GPP networks. For example, the LLC (logical link control) layer in WiFi systems has similar function although much simpler than RLC in 3GPP networks.

Figure 8:
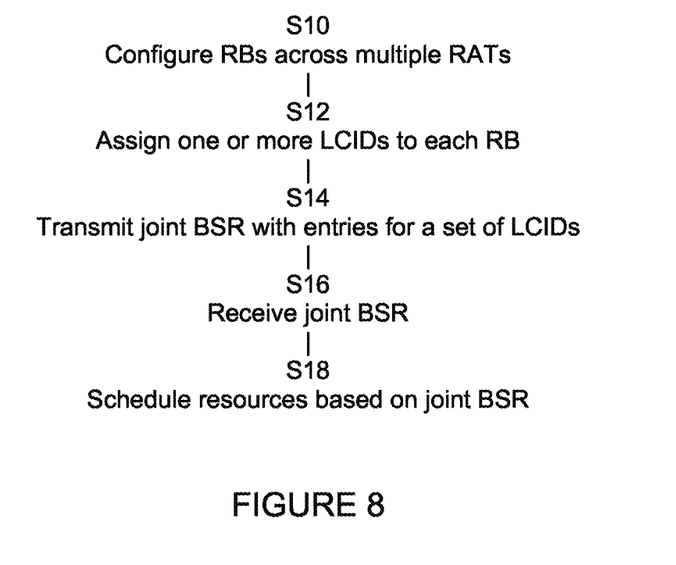
FIG. 8 is a flowchart of steps in a method embodying the invention.

FIG. 8 shows steps in a method embodying the invention.

Step S10 is to configure RBs for servicing the UE across multiple RATs. In Step S12, one or more LCIDs is assigned to each RB. That is, when the radio bearer RB1 (with multi-RAT multi-flow aggregation configured) is set up by the network, multiple logical channel IDs are assigned to this RB that may be associated with different RATs (e.g. as shown in FIG. 7, LC11 and LC12 for RB1). Also, logical channels associated with a certain RAT may be grouped into one logical channel group for radio resource scheduling purposes. Thus, in embodiments of the present invention there is no longer a one to one correspondence between RBs and LCs. A single RB may span multiple RATs and be associated with multiple LCs, whilst LCs of the same RAT may be grouped together to form an LCG.

In step S14, on the terminal side, the UE performs the buffer status reporting procedure, according to the configuration, on all involved RATs (depending on the requirements of different RATs) and sends reports/indications to one or more involved base stations. This is denoted in FIG. 8 by step S14, "transmit joint BSR with entries for a set of LCIDs", since the joint BSR is a preferred form of such reporting as explained later.

The buffer status reporting procedure may be triggered by the arrival of data for UL transmission in the UE's buffer. If there is no data to be transmitted on the UL, there is no need to send a BSR from the UE's viewpoint. However, transmission of the BSR may nevertheless be requested by the network (e.g. on a periodic basis).

The UE may indicate its preference for a given RAT by assigning data to one specific LCG (corresponding to the preferred RAT). This "preference" refers primarily to preference for transmission of uplink data, but could also apply to preference for RATs on which to receive downlink data. The UE's preference need not be exclusively, or even partly, based on signal quality, but could be based on economic considerations: for example use of WiFi will normally be free whereas usage of LTE may incur charges.

In addition, the UE may leave such LCG (corresponding to a specific RAT) empty, when the quality of this RAT is below the QoS requirements, that is to say, when the channel quality on this RAT is so poor that the required QoS cannot possibly be achieved. The UE is able to assess this on the basis of measurements on reference signals. To measure the UL directly, reference signals from the UE can be measured by the network and the results advised to the UE. On the other hand, if UL/DL channel reciprocity can be assumed (as in Time Division Duplex, TDD operation for example), or if the UL and DL channel quality are strongly correlated, the UL channel quality can be estimated from the reference symbols on the DL in the case where the UE is able to perform DL measurements on all the involved RATs.

Additionally, the network may configure constraints on data assigned to a given LCG, for example that the data should not be transmitted via a particular RAT. This would enable control signalling to be restricted to LTE, while user data could also be sent via WiFi (which requires no explicit scheduling on the network side).

In step S16, the joint BSR transmitted by the UE is received by the network, more particularly by each of one or more base stations involved. The BSR may be received directly from the UE by each base station, or alternatively may be received by at least one of the base stations and forwarded to any remaining base stations. It is noted that the same base station may operate according to more than one RAT, as in FIG. 6(B).

In step S18, based on the multi-RAT buffer status reports from the UE as well as other criteria, e.g. pre-defined rules/policy, on the network side the decision will be made on whether to grant the UE resources on a particular RAT, which could then be used for next UL transmission or next period of UL transmissions. This means that the UE may have to reconsider its decision to assign data for transmission on a specific RAT, if the network does not grant resources on that RAT. Generally the same RAT will handle the re-transmission if required.

Some features or embodiments of the present invention will now be described by way of example.

In a general unless otherwise stated, the embodiments described here are based on LTE, in combination with other radio access technologies. Such a network comprises one or more LTE eNodeBs together with other base stations or access points of other RATs, each controlling more than one cell. Each cell may serve one or more terminals (UEs) which may receive and decode signals transmitted in that cell. The UEs support LTE and at least one other RAT, In order to schedule the appropriate use of transmission resources in time, frequency and spatial domains for transmission to and from the UEs, the network sends control signalling to the UEs. In LTE, in the uplink direction, uplink buffer status reports (BSR) are needed for the UEs to provide support for QoS-aware packet scheduling. The details of BSR are configured by RRC signalling. In this invention the buffer status report includes data which may be sent using LTE or another RAT.

Radio Bearer Management

For a UE configured with multi-RAT multi-flow aggregation, when the radio bearer is set up for this UE by the network, multiple logical channel IDs are assigned to this RB that are associated with different RATs. Logical channels associated with a certain RAT may be grouped into one logical channel group for radio resource scheduling reasons.

As variations of this embodiment, a given LCID or LCG may be associated with one or more RATs. For example one LCG can be associated with WiFi and the others with LTE. This would enable some data (e.g. delay insensitive) to be preferentially sent via WiFi. A similar effect may be achieved if data for a given LCID or LCG is excluded from the BSR. Such data could be sent via WiFi as initiated by the UE.

As a further variation, data from a given LCID or LCG may be prohibited from being transmitted on a particular RAT. This approach could be used to ensure that signalling or data with high QoS requirements is sent via LTE and not via WiFi. The network nodes may exchange information on the UE configuration, for example to allow correct interpretation of BSRs sent via different RATs to different network nodes (for example, BSRs each sent via a given RAT to a base station of that RAT, and relating to that RAT).

Multi-RAT Buffer Status Reporting

In this embodiment, the UEs that have been configured with multi-RAT multi-flow aggregation report the buffer status information of two or more of the involved RATs by transmitting a joint BSR covering the involved RATs. This needs to be instructed by the network via, for example, RRC signalling in LTE.

Figure 9:
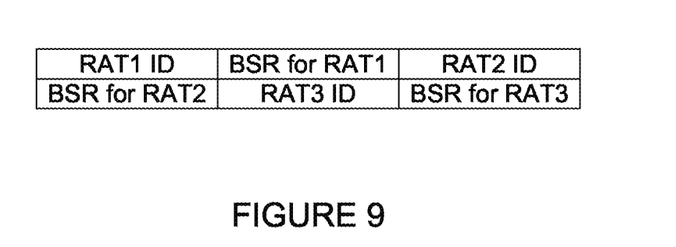
FIG. 9 illustrates a possible format of a joint buffer status report from a UE in one embodiment of the present invention.

FIG. 9 shows a possible format for such a joint BSR, in which each RAT involved in the report is identified by an ID field, followed by an indication of the buffer status for that RAT, in other words an indication of the amount of data which the UE wishes to transmit, in the next transmission time period to which the report applies, via that RAT. Various formats for such a report are possible, as will be appreciated by those skilled in the art. The format of the report, and time period to which the report applies, may vary depending on the trigger for the report (e.g. periodic trigger from the network, or ad-hoc trigger due to data arrival in the buffer).

Thus, different from the existing BSR, this new type of report contains information of multiple RATs (both 3GPP RATs and non-3GPP RATs) and needs to be available to all involved base stations. This can be done through individual physical channels of each of the different RATs, or using only one RAT, and with information transfer between base stations. Alternatively, this can be done using or an UL channel that is available for all base stations. Thus, the present invention may provide a joint buffer status report covering all (or some) involved RATs.

UE may indicate its preference of RAT by assigning data to one specific LCG (corresponding to the preferred RAT). In addition, the UE may leave such LCG (corresponding to a specific RAT) empty when the quality of this RAT is below the QoS requirements. This can be achieved, for example, by a zero value of a field corresponding to the RAT concerned in a "joint" BSR. More generally, one or more reserved values may be defined to denote the UE's preference not to employ a specific RAT for its uplink transmission. Alternatively, the same effect may be achieved by omitting one or more fields in the BSR provided for a specific RAT or LCG.

Various modifications are possible within the scope of the present invention.

The above description refers to a UE, but the invention is also applicable to other types of wireless device receiving data on a downlink of a multi-RAT system, for example a relay or picocell base station. In that case, the relay/picocell behaves as an UE towards a base station that controls the radio resources (a donor eNB in LTE terminology).

Also, although the description assumes that different base stations employ different RATs, it would be possible for some of the base stations to be using the same RAT but operated by different mobile operators (in other words in different RANs using the same RAT). As exemplified by FIG. 6(B), the same base station may operate in accordance with more than one RAT simultaneously; in other words it may provide "base station means" for more than one RAT.

Reference was made above to associating logical channels with a certain RAT to form an LCG; thus, an LCG would normally apply to one RAT. However it would also be possible for one LCG to span multiple RATs.

More generally, although conventionally a given LCID or LCG is only associated with one RAT, there is no need to follow this restriction in the present invention. Assuming that the configured characteristics of an RB are mainly related to the UE's application requirements, then for example it would be possible to assign an RB to one LC which is then mapped to two different RATs. Alternatively an RB could be assigned to two different LCs each of which can be associated with a different RAT.

It is noted that not every RAT will necessarily employ the same transmission time periods such as frames. The base stations (or higher-level nodes) of the involved RATs may need to agree a common timing structure to which the transmission time units of each individual RAT can be mapped. However, different frame lengths at the physical layer may not be an issue at higher layers, which may not need to conform to a particular frame timing.

To summarise, embodiments of the present invention enable a novel buffer status reporting scheme which enables the co-ordination of multiple base stations of different RATs (e.g. LTE eNB, UMTS base station, WiFi access point, etc.) with the assistance of the UEs in order to achieve efficient radio resource scheduling for multi-RAT multi-flow aggregation in uplink.

When a radio bearer (with multi-RAT multi-flow aggregation configured) is set up by the network, multiple logical channel IDs are assigned to this RB that may be associated with different RATs. Logical channels associated with a certain RAT (or a given set of RATs) may be grouped into one logical channel group for radio resource scheduling purposes. On the terminal side, the UE performs the buffer status reporting procedure, according to the configuration, on all involved RATs and sends reports/indications to one or more involved base stations.

INDUSTRIAL APPLICABILITY

The invention enables efficient uplink radio resource scheduling for multi-RAT multi-flow aggregation in a mobile communication system where terminals are configured to transmit and receive data simultaneously using multiple base stations of different radio access technologies (RATs). This invention allows multi-RAT radio resources to be used simultaneously to a single UE for uplink transmission thus improving data rates and the user experience across the entire coverage area, furthermore improving the overall system load balancing.

The invention claimed is:

1. A method for uplink communication between a terminal and a multi-RAT (radio access technology) wireless communication network comprising one or more base stations, at least one of the base stations comprising an LTE eNodeB, the method comprising:
   in the multi-RAT wireless communication network,
      configuring one or more radio bearers, each radio bearer to be carried by one or more radio access technologies (RATs) among a plurality of RATs available to the terminal, and
      associating logical channels with the one or more radio bearers by assigning to each radio bearer one or more logical channels; and
   in the terminal,
      transmitting to the one or more base stations, one or more buffer status reports wherein at least one of the buffer status reports contains information on data to be sent on the one or more logical channels assigned to a radio bearer among said one or more radio bearers and which is to be carried by more than one RAT.

2. The method according to claim 1, wherein one or more groups of logical channels are configured from among the one or more logical channels assigned to said one or more radio bearers, and the at least one of the buffer status reports contains information on data to be sent on each of the one or more groups of logical channels.

3. The method according to claim 1, further comprising: assigning one or more logical channels to said one or more radio bearers to be carried by a single RAT, the method further comprising the terminal, prior to transmitting buffer status reports, assigning data to said one or more logical channels for uplink transmission in accordance with at least one of:
   a preference for the single RAT;
   a signal quality with respect to the single RAT;
   a quality of service requirement for the data; and
   a network constraint on usage of the single RAT.

4. The method according to claim 1, further comprising, in the multi-RAT wireless communication network, granting, in respect of a set of logical channels associated with a set of said one or more radio bearers, uplink resources on one or more RATs on a basis of:
   the one or more buffer status reports; and
   a network policy on usage of each RAT for uplink data transmission.

5. The method according to claim 1, further comprising: assigning one or more logical channels to a said radio bearer to be carried by one or more of the plurality of RATs available to the terminal excluding a specific RAT.

6. The method according to claim 1, wherein the at least one of the buffer status reports is transmitted to each of one or more base stations operating according to each RAT by which said each radio bearer is configured to be carried.

7. The method according to claim 1, wherein at least one of entries in a buffer status report is associated with a given RAT, and the terminal indicates a preference not to employ a given RAT for its uplink transmission by a zero value for said at least one of entries in the buffer status report which is associated with the given RAT.

8. The method according to claim 1, wherein at least one of entries in a buffer status report is associated with a given RAT, and the terminal indicates a preference not to employ the given RAT for its uplink transmission by omitting said at least one of entries in the buffer status report which is associated with the given RAT.

9. A multi-RAT (radio access technology) wireless communication system, comprising:
   a terminal arranged to perform at least uplink communication via first and second RATs, the first RAT being LTE;
   a first base station for the first RAT and comprising an LTE eNodeB; and
   a second base station for the second RAT; wherein the first base station and the second base station are arranged to co-operate to configure one or more radio bearers to be carried at least on an uplink by one or more of the first and second RATs, and to associate logical channels with the one or more radio bearers by assigning one or more logical channels to the one or more radio bearers;
   wherein the terminal is arranged to assist multi-RAT uplink scheduling by transmitting, using one or more of the first and second RATs, one or more buffer status reports where at least one of the buffer status reports contains information on data to be sent on the one or more logical channels assigned to a radio bearer among said one or more radio bearers and which is to be carried by more than one RAT.

10. A base station comprising an LTE eNodeB and using LTE as a first RAT (radio access technology) for use in a multi-RAT wireless communication system in which system a terminal is arranged to perform at least uplink communication via first and second RATs; the base station arranged to:

co-operate with a second base station which uses the second RAT, to configure one or more radio bearers to be carried at least on an uplink by one or more of the first and second RATs, and to associate logical channels with the one or more radio bearers by assigning one or more logical channels to the one or more radio bearers;

wherein the base station is further arranged to:

receive, from the terminal, one or more buffer status reports transmitted using one or more of the first and second RATs where at least one of the buffer status reports contains information on data to be sent on the one or more logical channels assigned to a radio bearer among said one or more radio bearers and which is to be carried by the first and second RATs; and     assign, in respect of the one or more logical channels assigned to the radio bearer which is to be carried by the first and second RATs, resources for uplink transmission by the terminal in the first RAT, in co-operation with the second base station assigning resources in the second RAT.

11. The base station according to claim 10 wherein the base station is further arranged to forward to the second base station at least a portion of a buffer status report relating to the second RAT.

12. A multi-RAT (radio access technology) base station provided for wireless communication at least on an uplink with a terminal via first and second RATs, the first RAT being LTE, and the multi-RAT base station comprising an LTE eNodeB and arranged to:

configure one or more radio bearers, each of the radio bearers to be carried at least on the uplink by one or more of the first and second RATs, and associate logical channels with the radio bearers by assigning one or more logical channels to each radio bearer;

wherein the base station is further arranged to:

receive, from the terminal, one or more buffer status reports where at least one of the buffer status reports contains information on data to be sent on the one or more logical channels assigned to a radio bearer among said one or more radio bearers and to be carried by the first and second RATs; and     assign, in respect of the one or more logical channels assigned to the radio bearers to be carried by the first and second RATs, resources in the first and second RATs for uplink transmission by the terminal.

13. A terminal for use in a multi-RAT (radio access technology) wireless communication system in which the terminal is arranged to perform at least uplink communication via first and second RATs, the first RAT being LTE; the terminal arranged to:

receive a configuration of one or more radio bearers to be carried at least on an uplink by one or more of the first and second RATs, in which configuration logical channels are associated with the one or more radio bearers by assigning one or more logical channels to each radio bearer; where the terminal is further arranged to:

transmit one or more buffer status reports using the first and second RATs where at least one of the buffer status reports contains information on data to be sent on the one or more logical channels assigned to a radio bearer among said one or more radio bearers and which is to be carried by the first and second RATs; and     receive, in response to the buffer status reports, an assignment of resources for uplink transmission by the terminal in the first and second RATs with respect to the one or more logical channels assigned to the said radio bearer.

\* \* \* \* \*